F. H. LaPort,
Millstone Exhaust.
No. 113,534. Patented Apr. 11, 1871.
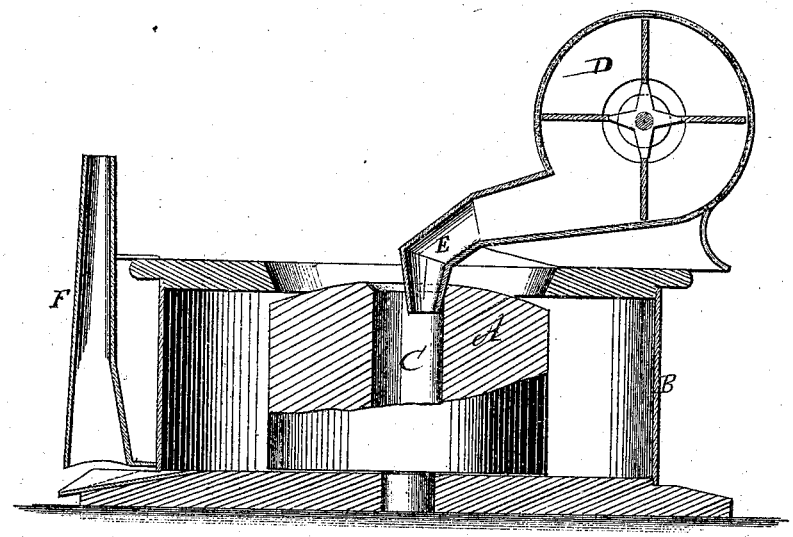
Witnesses:
Gustave Dieterich
L. S. Mabee
Inventor:
F. H. LaPort
Per Munn & Co
Attorneys.

United States Patent Office.

FRANKLIN H. LA PORT, OF CLARINDA, IOWA.

Letters Patent No. 113,534, dated April 11, 1871.

IMPROVEMENT IN GRINDING-MILLS.

The Schedule referred to in these Letters Patent and making part of the same.

*To all whom it may concern:*

Be it known that I, FRANKLIN H. LA PORT, of Clarinda, in the county of Page and State of Iowa, have invented a new and useful Improvement in Grinding-Mills; and I do hereby declare that the following is a full, clear, and exact description thereof which will enable others skilled in the art to make and use the same, reference being had to the accompanying drawing forming part of this specification.

The object of this invention is to provide efficient means for preventing the heating of mill-stones, and consequently the heating of the ground grain, as flour or meal in the process of grinding; and It consists in forcing a current of air into the eye of the stone, and in a pipe for discharging the dust, as hereinafter described.

The accompanying drawing represents a side view of a grinding-stone provided with the forcing apparatus or blower and pipe.

Similar letters of reference indicate corresponding parts.

A represents the stone.

B is the curb.

C is the eye of the stone.

D represents a fan-blower, which is placed in any convenient location, by which a current of cold air is forced into the eye of the stone through the pipe E, as seen in the drawing.

The current of cold air prevents the heating of the stone and the ground grain. All dampness is carried off, dough is prevented from collecting, and the general operation of the mill is greatly improved.

The current of air passes through the stone and connects with the discharge-pipe F, through which the dust and air-current are discharged.

By keeping the stone cool and the air within the curb dry the liability of the products of the mill to become sour, and consequently unfit for market, is prevented, while the mill itself works free and unobstructed.

The whole operation is greatly facilitated by being kept at a proper temperature.

Having thus described my invention,

I claim as new and desire to secure by Letters Patent—

The arrangement of the blower D, with pipe E, eye C of the millstone A, casing B, and pipe F, when all are constructed and operated as herein shown and described, for the purposes set forth.

F. H. LA PORT.

Witnesses:
N. L. VAN ZANDT,
T. J. BRACKEN.